UNITED STATES PATENT OFFICE.

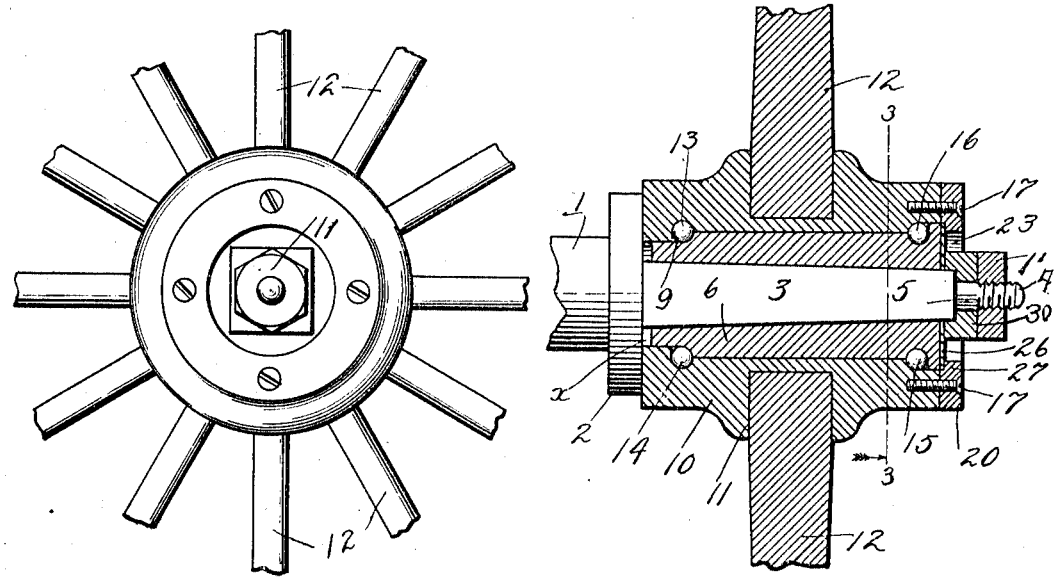

DAVID A. SNYDER, OF JERSEY CITY, NEW JERSEY.

ANTIFRICTION-BEARING FOR VEHICLE-WHEELS.

1,061,506.  Specification of Letters Patent.  Patented May 13, 1913.

Application filed July 18, 1910. Serial No. 572,446.

*To all whom it may concern:*

Be it known that I, DAVID A. SNYDER, a citizen of the United States, and a resident of Jersey City, in the county of Hudson and State of New Jersey, have invented certain new and useful Improvements in Antifriction-Bearings for Vehicle-Wheels, of which the following is a specification, reference being had to the accompanying drawings.
This invention relates to improvements in vehicle wheels.

The primary object of my invention is to provide a wheel hub having ball bearings, so constructed that the wheel can be readily taken from the axle without disarranging the anti-friction bearings.

Another object is to provide an anti-friction bearing for vehicle wheels, so constructed that the wear of the parts may be taken up to prevent any lateral play or wabbling of the wheel.

With these and other objects in view, the present invention consists in the combination and arrangement of parts as will be hereinafter more fully described and finally pointed out in the appended claim, it being further understood that changes in the specific structure shown and described may be made within the scope of the claim, without departing from the spirit of the invention.

In the accompanying drawings forming a part of this specification, and in which like numerals of reference indicate similar parts in the several views:—Figure 1, shows a front view of a hub with fragmentary portions of the spokes of a hub constructed according to my invention. Fig. 2, shows a lengthwise sectional view through the hub and bearings. Fig. 3, is a sectional view through line 3—3 of Fig. 2, in the direction of the arrow. Fig. 4, shows an enlarged detail of the cylindrical spindle sleeve. Fig. 5, shows a detached detail of the lock washer as used in my invention.

In wagon wheel construction it is quite essential that the wheel will run lightly upon the axle spindle, and that the wear of the parts may be taken up to prevent wabbling of the wheel.

In the accompanying drawings, the numeral 1, represents an axle having the stop collar 2, and the square tapering spindle, 3, ending in the bolt or threaded termination,
4. Removably held upon the square axle spindle, 3, is the cylindrical spindle sleeve, of a length less than said spindle, having a quarter circular ball race, 9, at the rear end, and a half circular ball race, 8, near the forward end, adjacent to the collar, 7, which collar is of a diameter greater than the diameter of the cylindrical sleeve, 6, as clearly shown in Fig. 4.

The hub comprises a nave 10, having suitable spoke sockets 11, within which the spokes, 12, are secured in the usual manner. The nave or hub 10, near the end is provided with the half circular ball race, 13, within which the balls, 14, rotate in conjunction with the ball race, 9, while near the forward end the nave is provided with the quarter circular ball race, 15, within which the balls, 16, operate in conjunction with the semi-circular ball race 8.

The hub as shown in Fig. 2, is provided with three cylindrical openings of successively greater diameters. The length of the sleeve, 6, is less than the spindle, 3, so as to provide the take-up space, $x$, between the collar 2, and the sleeve, 6, as clearly disclosed in Fig. 2.

The hub is provided with a plurality of threaded openings to receive the screws, 17, which pass through the cap plate, 20, which overlaps the collar, 7, of the spindle sleeve, 6. This cap plate, 20, is provided with an offset, 27, arranged to receive suitable washers, so that when the ball races wear away the wear may be taken up.

The hub or nave may be made of any suitable material. As the parts wear, the washers, 26, are interposed between the sleeve, 6, and the cap plate, 20, so as to tightly hold the ball series, 14 and 16, within their race. At the same time washers of suitable thickness may be interposed between the axle collar, 2, and the nave, to insure a proper contact of the rear hub face. In this manner the wheel is revolubly supported in a manner securely holding the wheel against any lateral movement or wabbling motion. In order to hold the washer, 26, in place, I use a lock washer, 30, against which the outer nut, 1', locks.

A wheel hub constructed according to my invention is comparatively inexpensive, and both durable and efficient in operation, and the hub can at any time be removed from the axle without disarranging the bearing parts.

Having thus described my said invention, what I claim as new and desire to secure by United States Letters Patent, is:—

The combination with an axle having a squared spindle and a reduced threaded end; of a hub having a pair of inner and outer ball races opening outwardly, a circular sleeve snugly fitting in the hub and having a square bore engaging the spindle and of less length than the spindle, said sleeve having a similarly located series of ball races opening inwardly, the outer race forming a flange engaged within the sleeve, an annular ring detachably secured to the outer end of the hub and overlying the sleeve, a washer loosely mounted on the reduced end and having an inner rectangular recess engaged by the spindle and a nut threaded on said end over the washer.

In testimony whereof I affix my signature, in presence of two witnesses.

DAVID A. SNYDER.

Witnesses:
T. J. MacMahon,
John A. Maloney.